(12) United States Patent (10) Patent No.: US 8,995,942 B2
Watanabe (45) Date of Patent: Mar. 31, 2015

(54) RADIO COMMUNICATION DEVICE, SIGNAL STRENGTH OUTPUT METHOD AND RADIO COMMUNICATION SYSTEM

(75) Inventor: Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 12/890,768

(22) Filed: Sep. 27, 2010

(65) Prior Publication Data

US 2011/0081870 A1  Apr. 7, 2011

(30) Foreign Application Priority Data

Oct. 7, 2009 (JP) ................................. 2009-233025

(51) Int. Cl.
*H04B 17/00* (2006.01)
*H04W 56/00* (2009.01)
*H04B 1/40* (2006.01)

(52) U.S. Cl.
CPC . *H04W 56/00* (2013.01); *H04B 1/40* (2013.01)
USPC .................. 455/226.2; 455/226.1; 455/226.3; 455/226.4; 455/115.3; 455/67.11

(58) Field of Classification Search
CPC ........... H04B 17/0042; H04B 17/0057; H04B 17/006; H04B 17/0062; H04B 1/1027; H04B 1/30; H04W 56/00; G01S 1/047; G01S 5/021
USPC ........... 455/67.11, 226.2, 226.1, 226.3, 226.4
See application file for complete search history.

(56) References Cited

U.S. PATENT DOCUMENTS

| | | | |
|---|---|---|---|
| 5,802,039 A * | 9/1998 | Obayashi et al. .............. 370/216 |
| 5,844,935 A * | 12/1998 | Shoji ............................. 375/150 |
| 2003/0171128 A1 * | 9/2003 | Tandai et al. ................. 455/502 |
| 2004/0202229 A1 * | 10/2004 | Raphaeli et al. .............. 375/145 |
| 2005/0272460 A1 * | 12/2005 | Imai et al. ..................... 455/522 |
| 2008/0227394 A1 * | 9/2008 | Homan et al. ............... 455/41.3 |

FOREIGN PATENT DOCUMENTS

| | | |
|---|---|---|
| JP | 2004-304627 A | 10/2004 |
| JP | 2006-295462 A | 10/2006 |

* cited by examiner

*Primary Examiner* — Yuwen Pan
*Assistant Examiner* — Fatuma Sherif
(74) *Attorney, Agent, or Firm* — Wolf, Greenfield & Sacks, P.C.

(57) ABSTRACT

There is provided a radio communication device including a radio receiving unit to receive a radio signals, a synchronization unit to detect synchronization based on a result of a correlation for received signals output from the radio receiving unit, and a signal strength output unit to output, as signal strength of the received signals that is RSSI (Received Signal Strength Indicator) value, a level of a correlation signal that is output as a result of the correlation by the synchronization unit.

11 Claims, 8 Drawing Sheets

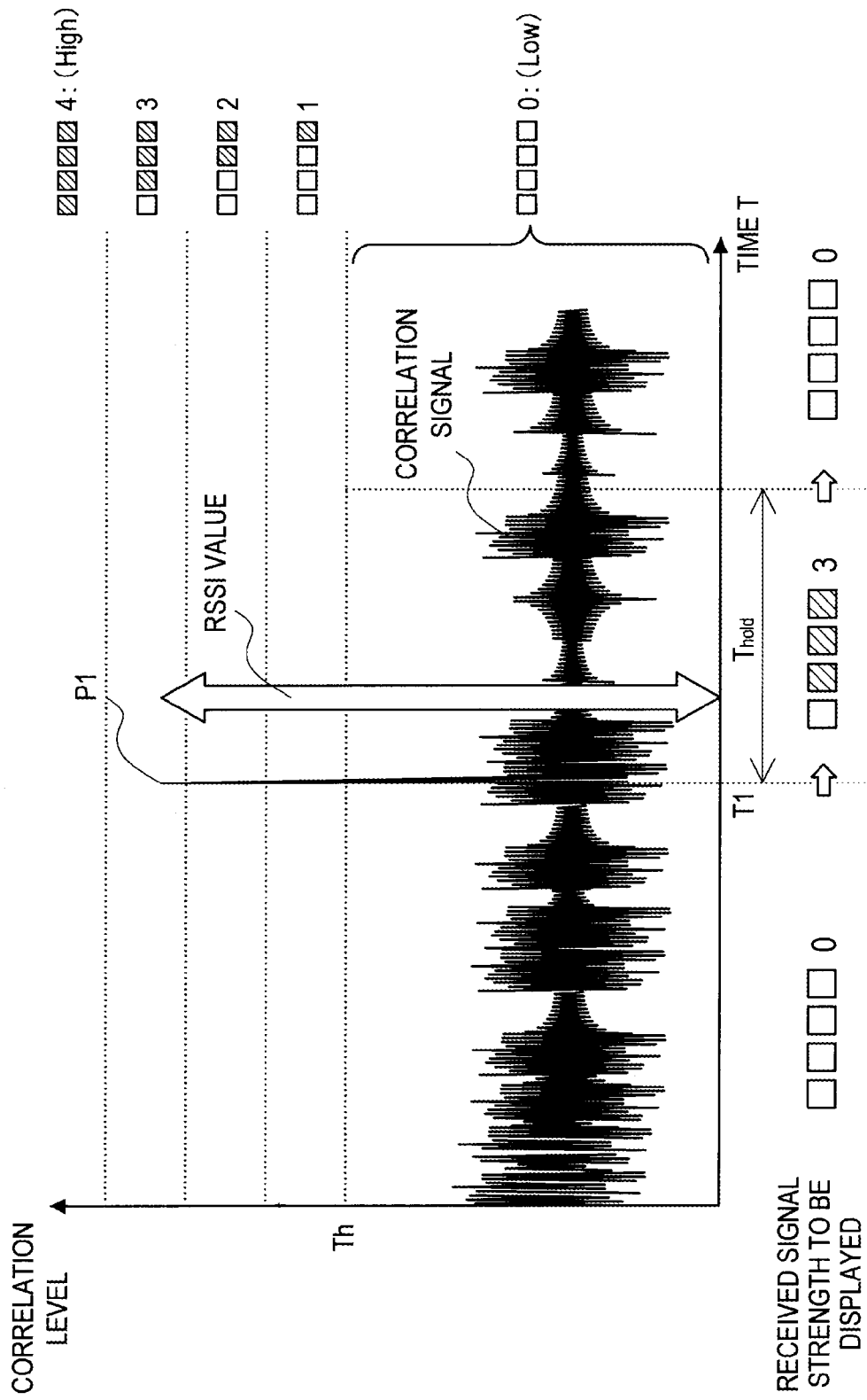

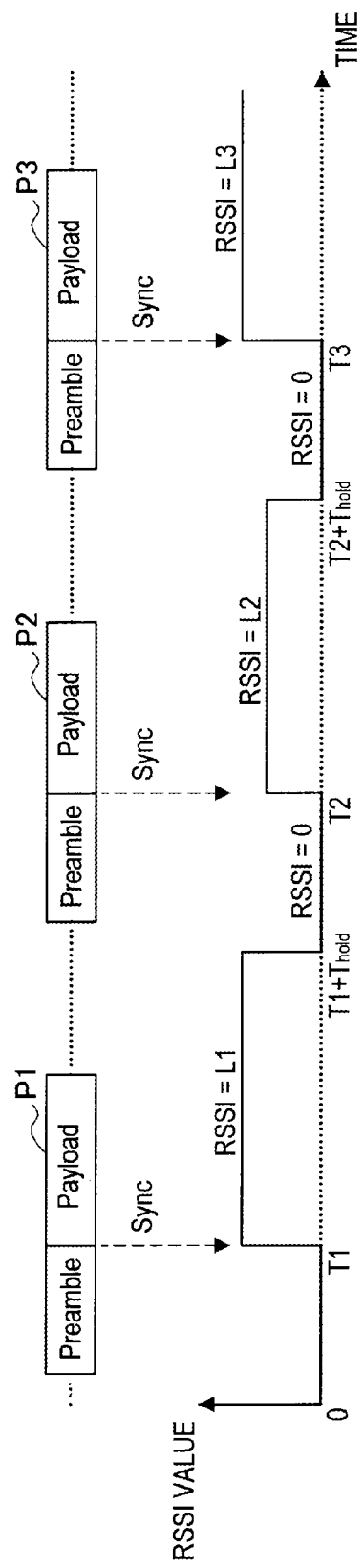

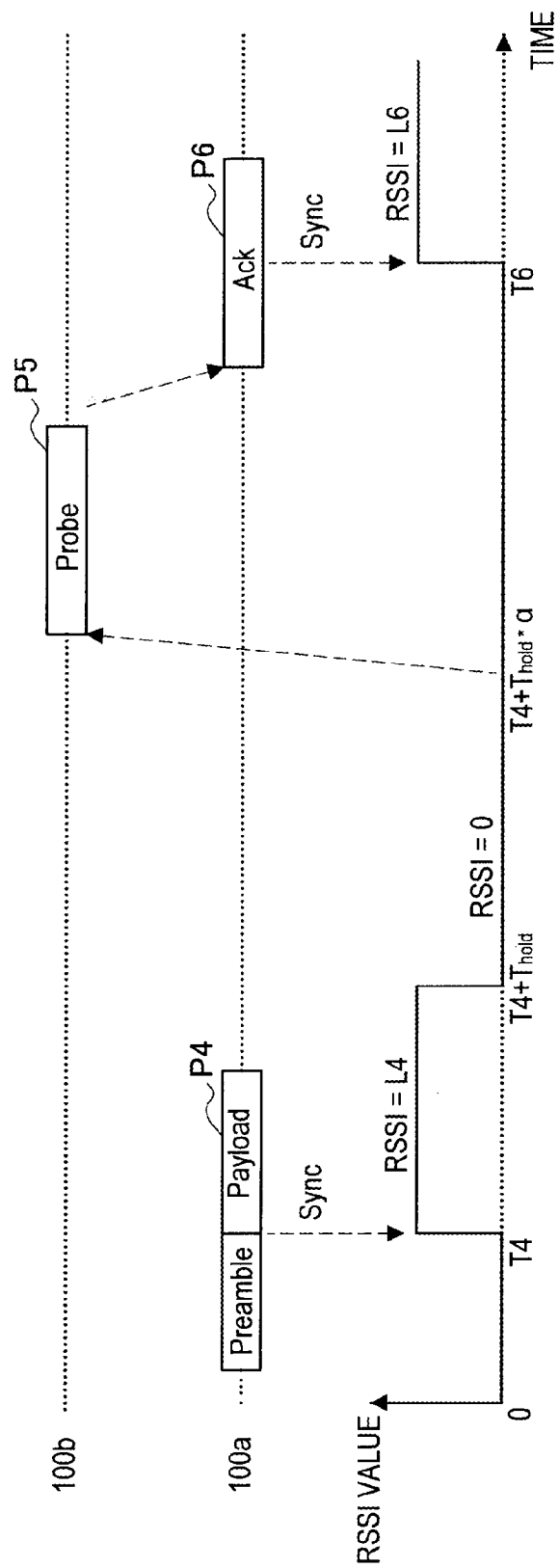

RADIO COMMUNICATION DEVICE, SIGNAL STRENGTH OUTPUT METHOD AND RADIO COMMUNICATION SYSTEM

CROSS REFERENCE TO RELATED APPLICATION

This application claims priority to Japanese Priority Patent Application JP 2009-233025, filed in the Japan Patent Office on Oct. 7, 2009, the entire content of which is hereby incorporated by reference.

BACKGROUND OF THE INVENTION

1. Field of the Invention

The present invention relates to a radio communication device, a signal strength output method and a radio communication system.

2. Description of the Related Art

Generally, a radio communication device includes a function called RSSI (Received Signal Strength Indicator) which measures signal strength of received radio signals. The signal strength measured by such RSSI function is notified to a user through a screen of a display device, or to be used as a parameter for controlling an output level of signals from a local device.

Examples of a technological development regarding the RSSI function are Japanese Unexamined Patent Application Publication No. 2004-304627 and Japanese Unexamined Patent Application Publication No. 2006-295462. The Japanese Unexamined Patent Application Publication No. 2004-304627 provides a method which converts control level information of an auto gain control to the received signal strength to render a dedicated RSSI circuit unnecessary eliminating a number of circuit parts. Moreover, the Japanese Unexamined Patent Application Publication No. 2006-295462 provides a method which controls a window length for smoothing digital RSSI signals so as to prevent turn-on delay in the RSSI signals.

SUMMARY OF THE INVENTION

However, a short-range high-speed radio communication such as TransferJet (registered trademark) has a relatively narrow communication range, and takes a short time for data transmission. Therefore, unless a change in the received signal strength is reflected promptly on RSSI signals, its value does not make sense. Accordingly, there is a need for a mechanism for obtaining received signal strength promptly with less processing amount which does not require processes such as the conversion from control level information of the auto gain control or the smoothing of the RSSI signals.

In light of the foregoing, it is desirable to provide a novel and improved radio communication device, a signal strength output method and a radio communication system that enable obtaining received signal strength promptly with less processing amount.

According to an embodiment of the present invention, there is provided a radio communication device including a radio receiving unit to receive radio signals, a synchronization unit to detect synchronization based on a result of a correlation for received signals output from the radio receiving unit, and a signal strength output unit to output, as signal strength of the received signals, a level of a correlation signal that is output as a result of the correlation by the synchronization unit.

In such configuration, correlation calculation for received signals to detect synchronization is performed by the synchronization unit, and a level of a correlation signal that is output as a result of the correlation would be output as a signal strength of the received signals.

The signal strength output unit may continuously output the level of the correlation signal as the signal strength until a prescribed time period elapses after the synchronization unit has detected the synchronization.

The signal strength output unit may output a value equivalent to zero as the signal strength if the synchronization unit does not detect synchronization.

The radio communication device may further include a radio transmitting unit to transmit a request signal that requests another radio communication device located in close proximity thereto to transmit radio signals if the synchronization unit does not detect synchronization over a certain period of time.

The radio communication device may further include a display unit to display the signal strength in accordance with the level of the correlation signal output by the signal strength output unit.

The request signal may be transmitted only when the radio communication device requests to communicate with another radio communication device.

Further, according to another embodiment of the present invention, there is provided a signal strength output method for outputting signal strength of received signals in a radio communication device including a radio receiving unit to receive radio signals and to output the received signals, including the steps of detecting synchronization based on a result of a correlation for the received signals, and outputting, as signal strength of the received signals, a level of a correlation signal that is output as a result of the correlation.

According to another embodiment of the present invention, there is provided a radio communication system including a radio transmitting device including a radio transmitting unit to transmit radio signals, and a radio receiving device including, a radio receiving unit to receive the radio signals transmitted from the radio transmitting device, a synchronization unit to detect synchronization based on a result of a correlation for received signals output from the radio receiving unit, and a signal strength output unit to output, as signal strength of the received signals, a level of a correlation signal that is output as a result of the correlation by the synchronization unit.

As described above, a radio communication device, a signal strength output method, and a radio communication system according to the present invention enable obtaining received signal strength promptly with less processing amount.

BRIEF DESCRIPTION OF THE DRAWINGS

FIG. 6 is an explanatory diagram showing a relationship between received signal strength and correlation level that are displayed by a display unit according to an embodiment;

FIG. 7 is a timing chart exemplifying a RSSI value output by a radio communication device according to an embodiment; and FIG. 8 is a timing chart exemplifying a RSSI value output if synchronization is not detected over a certain period of time.

DETAILED DESCRIPTION OF THE EMBODIMENT(S)

Figure 1:
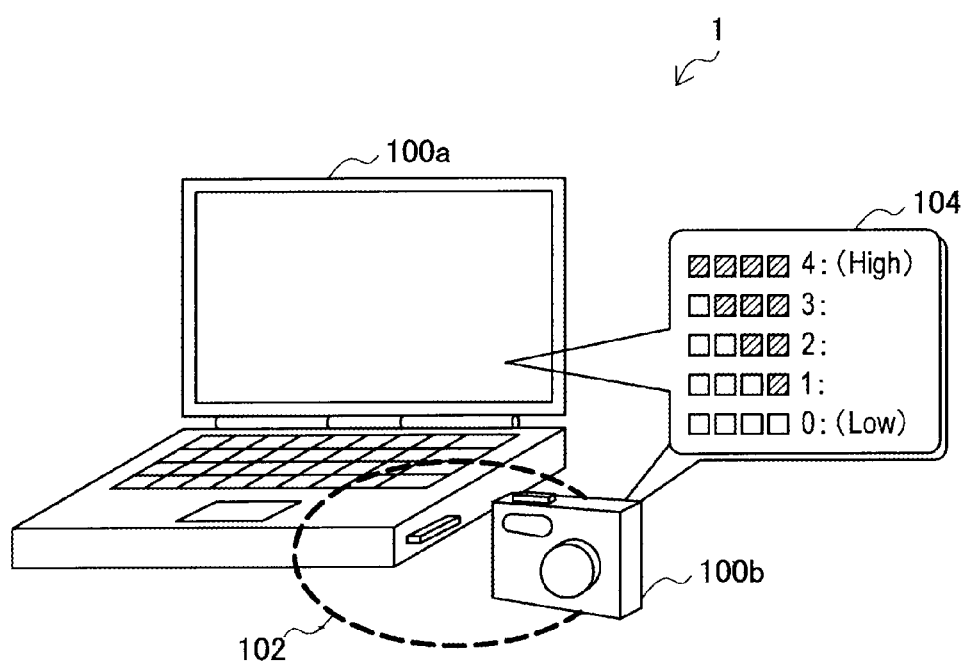
FIG. 1 is a schematic view showing an overview of a radio communication system according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order:
1. Overview of a radio communication system
2. An exemplary configuration of a radio communication device
3. Timing chart
4. Conclusion <1. Overview of a Radio Communication System>

Firstly, the overview of a radio communication system according to an embodiment of the present invention is described with reference to FIG. 1. FIG. 1 is a schematic view showing the overview of a radio communication system according to an embodiment. Referring to FIG. 1, the radio communication system 1 includes radio communication devices 100a and 100b.

The radio communication devices 100a and 100b are typically communication devices capable of transmitting and receiving data at high speed using radio signals. The example of FIG. 1 shows a PC (personal computer) as an example of the radio communication device 100a, and a digital camera as an example of the radio communication device 100b. However, the radio communication devices 100a and 100b are not limited to these examples, and may be other kinds of terminal device (such as a cellular phone terminal or a game machine, for example), a digital appliance (such as a television set or an audio player, for example), or a network device (such as a router or a radio interface card, for example).

The radio communication device 100a can transmit and receive various data including image data, audio data or the like, for example, with the radio communication device 100b located inside a communication area 102.

Communication protocol used for the communication between the radio communication devices 100a and 100b may be TransferJet (registered trademark), Bluetooth (registered trademark), Zigbee (registered trademark), wireless LAN (Local Area Network) or UWB (Ultra Wide Band), for example. A later-described signal strength output method according to an embodiment of the present invention is effective especially when to use a short-range high-speed radio communication method which is highly needed for obtaining the received signal strength promptly. However, it will be understood that by reading the later explanation that the signal strength output method can also be effective for a radio communication method for non-short-range communication such as 3G, 3.5G or 4G mobile communications.

One or both of the radio communication devices 100a and 100b has typically an indicator 104 to notify a user of the received signal strength. The indicator 104 may be implemented as an image to be displayed on a display of each device, or may be implemented as hardware using light-emitting elements such as LED. The indicator 104 is capable of displaying signal strength of the received signals in 5 levels from 0 to 4 (from Low to High), for example. According to the embodiment of the present invention later described, the signal strength of the received signals that the indicator 104 displays can be obtained promptly with less processing amount.

In the following description, when there is no particular need to distinguish between the radio communication devices 100a and 100b, they are referred to collectively as the radio communication device 100 by eliminating the alphabetical letter affixed to the reference numeral.

<2. An Exemplary Configuration of a Radio Communication Device>

Figure 2:
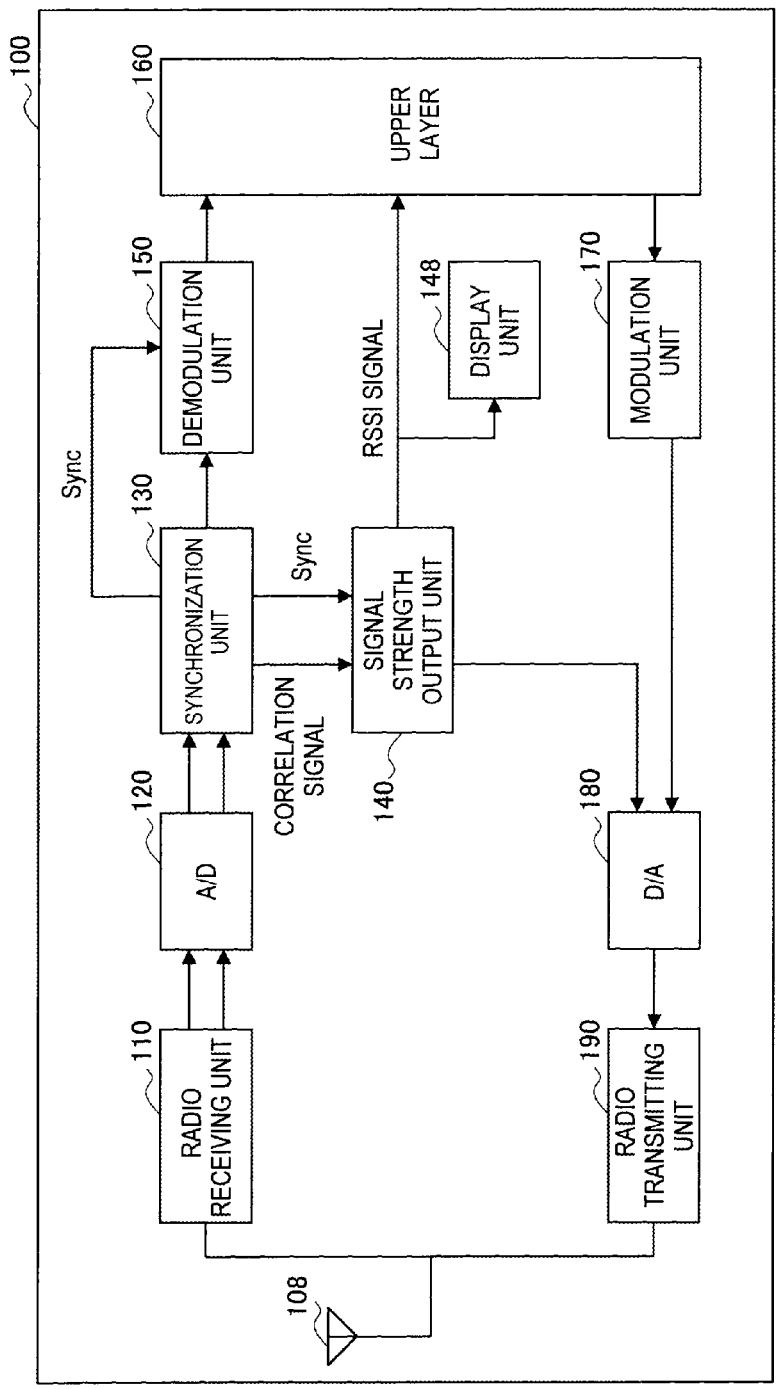
FIG. 2 is a block diagram exemplifying a configuration of a radio communication device according to an embodiment.

FIG. 2 is a block diagram exemplifying a configuration of a radio communication device according to an embodiment. Referring to FIG. 2, the radio communication device 100 includes an antenna 108, a radio receiving unit 110, analog/digital (A/D) converter 120, a synchronization unit 130, a signal strength output unit 140, a display unit 148, a demodulation unit 150, an upper layer 160, a modulation unit 170, digital/analog (D/A) converter 180 and a radio transmitting unit 190.

The antenna 108 is connected to the radio receiving unit 110 and the radio transmitting unit 190, and is used to receive and transmits radio signals. The radio receiving unit 110 is typically implemented as a RF (radio frequency) circuit. The radio receiving unit 110 receives the radio signals via the antenna 108, and outputs the received signals to the A/D converter 120 as described later.

Figure 3:
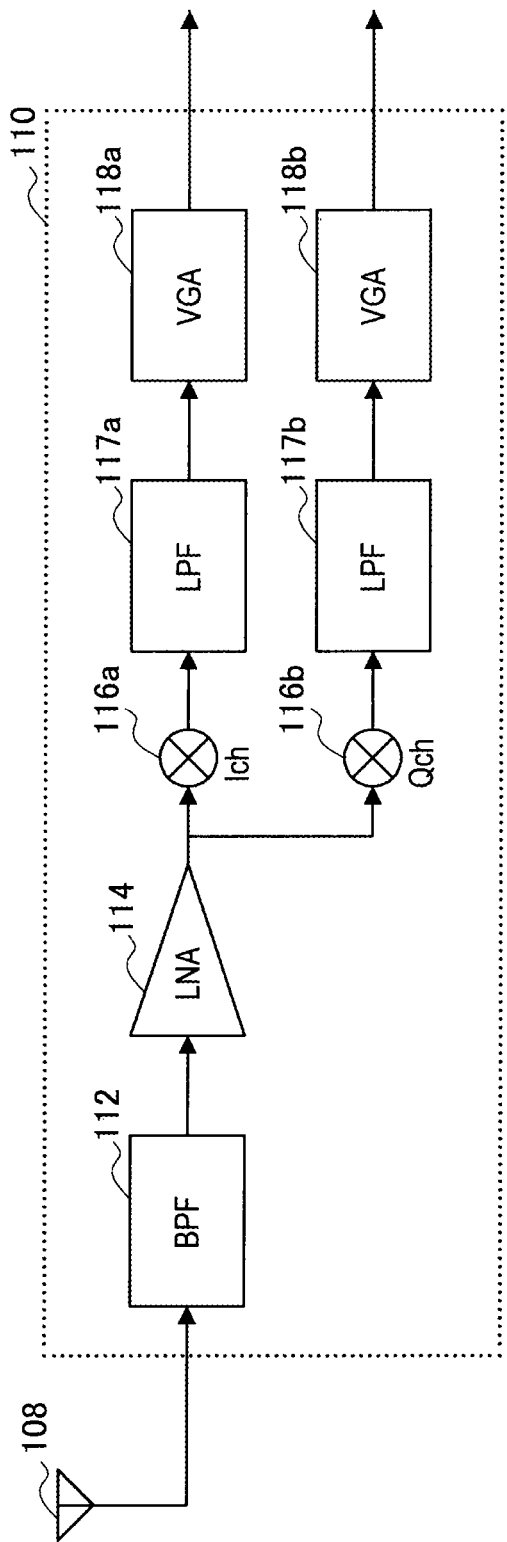
FIG. 3 is a block diagram exemplifying the detailed configuration of a radio receiving unit according to an embodiment.

FIG. 3 is a block diagram exemplifying the detailed configuration of a radio receiving unit 110 according to an embodiment. Referring to FIG. 3, the radio receiving unit 110 includes a band pass filter (BPF) 112, a low noise amplifier (LNA) 114, frequency converters 116a and 116b, low pass filters (LPF) 117a and 117b, and variable gain amplifiers (VGA) 118a and 118b. The BPF 112 extracts signals that include specific frequency components from the received signals input from the antenna 108. The LNA 114 amplifies the received signals that have been extracted including specific frequency components by the BPF 112. The frequency converter 116a converts frequency of I-channel components in the received signals amplified by the LNA 114 into intermediate frequency. Moreover, the frequency converter 116b converts frequency of Q-channel components in the received signals amplified by the LNA 114 into intermediate frequency. The LPH 117a reduces high-frequency components included in I-channel components of the received signals at intermediate frequency input from the frequency converters 116a. Moreover, the LPH 117b reduces high-frequency components included in Q-channel components of the received signals at intermediate frequency input from the frequency converters 116b. The VGA 118a amplifies I-channel components of the received signals input from the LPF 117a. Moreover, the VGA 118b amplifies Q-channel components of the received signals input from the LPF 117b. Then, I-channel components of the received signals amplified by the VGA 118a, and Q-channel components of the received signals amplified by the VGA 118b are to be output to the A/D converter 120 respectively.

The A/D converter 120 samples the received signals (I-channel components and Q-channel components) in analog form, which is input from the radio receiving unit 110, and converts them into digital form. The A/D converter 120 outputs the received signals, being converted into digital form, to the synchronization unit 130.

As described later, the synchronization unit 130 performs correlation calculation for the received signals that are output from the radio receiving unit 110 and converted into digital form by the A/D converter 120, and detects synchronization based on a result of the correlation.

Figure 4:
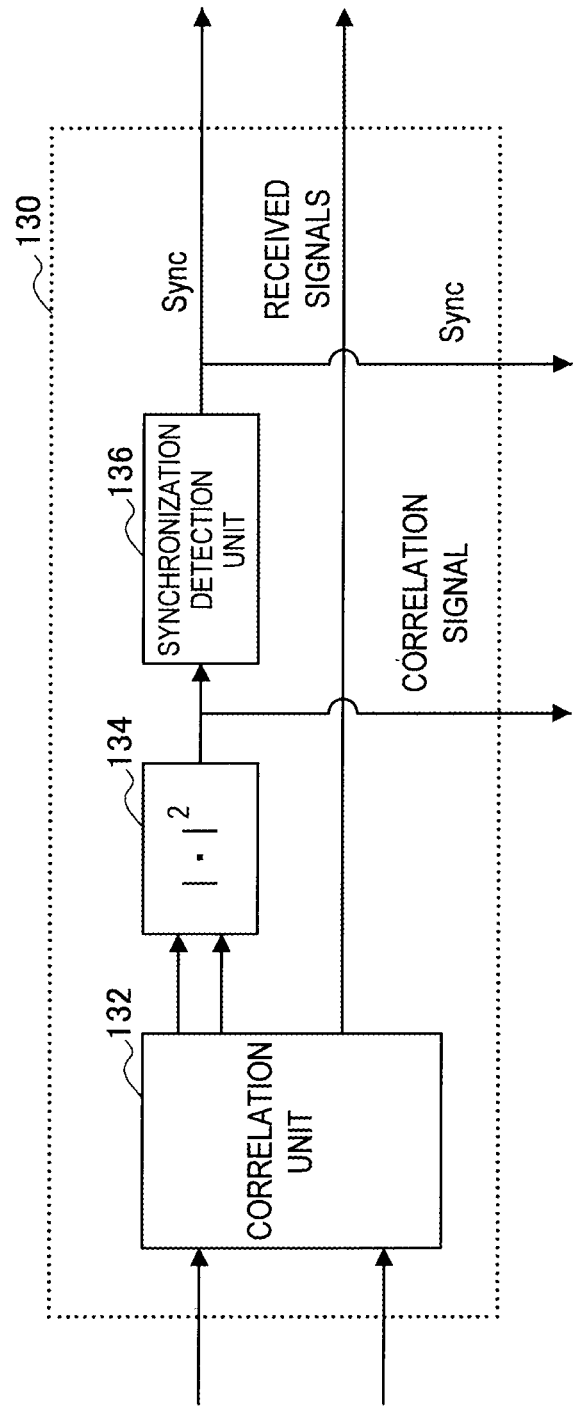
FIG. 4 is a block diagram exemplifying the detailed configuration of a synchronization unit according to an embodiment.

FIG. 4 is a block diagram exemplifying the more detailed configuration of the synchronization unit 130. Referring to FIG. 4, the synchronization unit 130 includes a correlation unit 132, a square absolute calculation 134, and a synchronization detection unit 136.

The correlation unit 132 correlate I-channel components and Q-channel components of the received signals being input from the A/D converter 120 with known signals stored in an inner memory.

The square absolute calculation 134 calculates squares sum of the absolute value of a correlation of I-channel components and of a correlation of Q-channel components, being calculated by the correlation unit 132. Correlation signals to be used for detecting synchronization are thereby generated. The square absolute calculation 134 outputs the correlation signals generated in such manner to the synchronization detection unit 136 and the signal strength output unit 140.

The synchronization detection unit 136 compares a level of the correlation signal input from the square absolute calculation 134 with a prescribed threshold. Then, the synchronization detection unit 136 outputs a synchronization detection signal (Sync=True) to the demodulation unit 150 and the signal strength output unit 140, if the level of the correlation signal exceeds the threshold.

Referring back to FIG. 2, the explanation will be continuously given on an example of the configuration of the radio communication device 100.

The signal strength output unit 140 outputs the above-described level of the correlation signal being output as a result of the correlation by the synchronization unit 130 to the display unit 148 and the upper layer 160 as the received signal strength (or instead, it may write it into a specific address of a register). Further, the signal strength output unit 140 continuously outputs the level of the correlation signal as a signal strength of the received signals until a prescribed time period elapses after the synchronization unit 130 has detected synchronization. The signal strength output unit 140 may output a value equivalent to zero (which means "outside the range", "outside of communication range" or the like") as the signal strength of the received signals if the synchronization unit 130 does not detect the synchronization.

Here, an explanation will be given on a model indicating a relationship between transmitted signals and received signals in the radio communication system 1. Firstly, given that a complex baseband signal at the transmission side is $S_{BB}(t)$, the transmitted signal $S_{TX}(t)$ as a real-valued signal modulated from the complex baseband signal at center frequency FC [Hz] is represented by the following equation.

[Equation 1]

$$S_{TX}(t)=Re(S_{BB}(t) \cdot \exp(2\pi j F_c t)) \quad (1)$$

The transmitted signal $S_{TX}(t)$ is received by the radio receiving unit 110. Given that an impulse response of a propagation channel and a receiving circuit between transmitting and receiving apparatuses is h(t), the received signal $S_{RX}(t)$ is represented by the convolution between the transmitted signal $S_{TX}(t)$ and the impulse response h(t) as the following equation.

[Equation 2]

$$S_{RX}(t)=S_{TX}(t) \otimes h(t) \quad (2)$$

Through processing such as frequency conversion or the like by the radio receiving unit 110, the complex baseband signal $S_{BBRX}(t)$ at the receiving side is generated from the receiving signal $S_{RX}(t)$. The complex baseband signal $S_{BBRX}(t)$ at the receiving side is represented by the following equation. Note that $T_c$ represents a transmit symbol period.

[Equation 3]

$$S_{BBRX}(t)=\int_o^{T_c} S_{RX}(t) \cdot \exp(-2\pi j F_c t) \cdot dt \quad (3)$$

Furthermore, given that the known signal used for the correlation by the correlation unit 132 of the synchronization unit 130 is c(t), that complex conjugate transpose thereof is c*(t), and that a code length of the known signal c(t) is $K \cdot T_c$, the correlation signal $S_{cor}(t)$ obtained as the result of the correlation is represented by the following equation.

[Equation 4]

$$S_{cor}(t)=\int_o^{K \cdot T_c} S_{BBRX}(t) \cdot c^*(t) \cdot dt \quad (4)$$

Thus, when the known signal c(t) conforms with the complex baseband signal $S_{BBRX}(t)$, the correlation signal $S_{cor}(t)$ shows its peak. Generally, the peak value of the correlation signal becomes higher as a SNR (signal to noise ratio) is higher, that is, a receiving environment is better. Here, given that a noise level is not significantly changed during transmission in the radio communication system 1 in general, if the peak value of the correlation signal is proportional to the SNR, it can be assumed that the peak value is proportional to the level of the received signal $S_{BBRX}(t)$. Therefore, in such receiving environment, the peak value of the correlation signal can be used as a scale $r_{RSSI}(t)$ for indicating the signal strength of the received signal as the following equation.

[Equation 5]

$$r_{RSSI}(t) \cong S_{cor}(t) \propto SNR \propto RSSI \quad (5)$$

Note that in equation 5, RSSI indicates a level of received signals actually received by the radio receiving unit 110.

Figure 5:
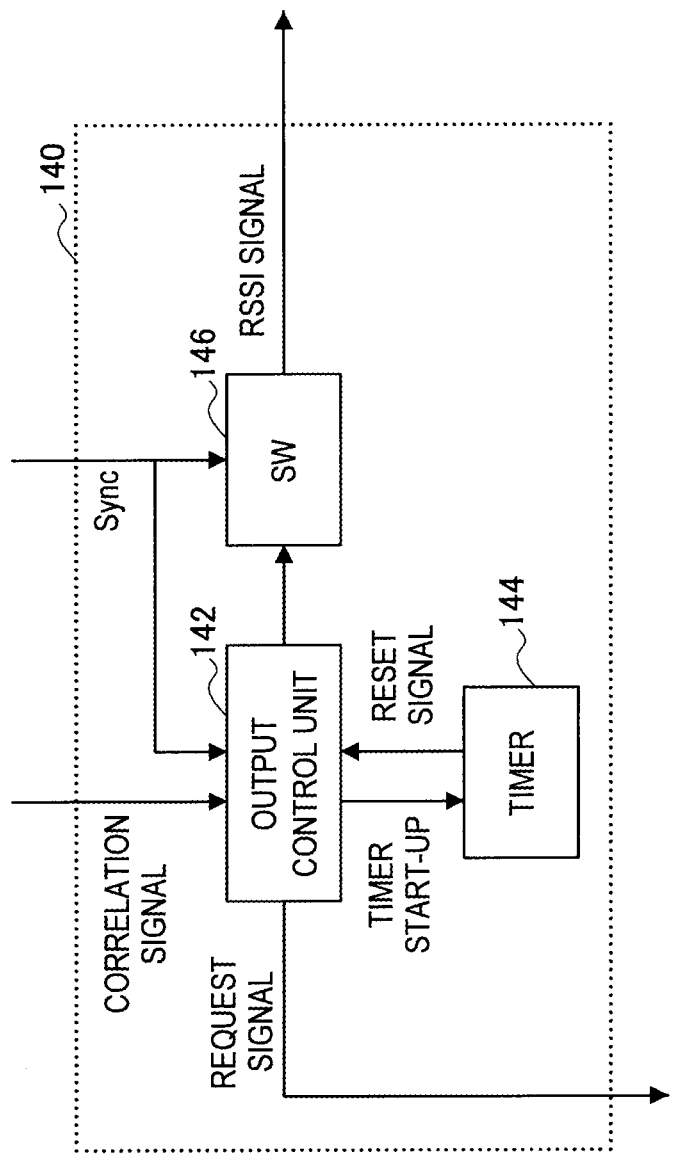
FIG. 5 is a block diagram exemplifying the detailed configuration of a signal strength output unit according to an embodiment.

FIG. 5 is a block diagram showing an example of a more specific configuration of the signal strength output unit 140. Referring to FIG. 5, the signal strength output unit 140 includes an output control unit 142, a timer 144, and a switch (SW) 146.

The output control unit 142 controls an output value of received signal strength by the signal strength output unit 140. More specifically, for example, when a synchronization detection signal (Sync=True) is input from the synchronization detection unit 136 of the synchronization unit 130, the output control unit 142 starts-up the timer 144 and starts a measurement of time. Then the output control unit 142 retains the value of the correlation signal input from the square absolute calculation 134 of the synchronization unit 130 at a time when the synchronization detection signal has been input, until a prescribed time period elapses, or until a new synchronization detection signal is input. It is defined herein that the prescribed time period that the output control unit 142 retains the value of the correlation signal is a RSSI survival period. The output control unit 142 continuously outputs the retained correlation signal value to the switch 146 as a value of the received signal strength, that is, the RSSI value. Note that the output control unit 142 may output the value after quantized to a numeric value in five levels as shown in FIG. 1, for example, instead of outputting the retained correlation signal value as a RSSI value as it is. Moreover, the time when the measurement of the RSSI survival period is started by the output control unit 142 is not limited to the time when the synchronization detection signal is input (generally it is a time when receiving a preamble of packets ends), but it may be a time when receiving the whole packets including payload ends, for example.

Further, the output control unit 142 may generate a request signal that requests another radio communication device located in close proximity thereto to transmit radio signals if the synchronization unit 130 does not detect synchronization over a certain period of time. In this case, the output control unit 142 controls the radio transmitting unit 190 to transmit the generated request signal via the antenna 108. Thus, if there is another radio communication device located in close proximity thereto, this another radio communication device receives the request signal and send back a response signal. This enables the output control unit 142 to update the RSSI value dynamically.

The timer 144 is started-up by the output control unit 142 and measures time. For example, when the RSSI survival period mentioned above has elapsed since the time started-up, the timer 144 outputs a reset signal to the output control unit 142 to reset the correlation signal value retained by the output control unit 142 to zero.

The switch 146 outputs the RSSI (received signal strength indication) signal whose signal value is RSSI value being input from the output control unit 142, to the display unit 148 and the upper layer 160. Note that the switch 146 replaces the RSSI signal value with a value equivalent to zero to output if a signal (Sync=False) indicating a failure in synchronization detection is input from the synchronization detection unit 136 of the synchronization unit 130.

Referring back to FIG. 2 again, the explanation will be continuously given on an example of the configuration of the radio communication device 100.

The display unit 148 displays the received signal strength using the indicator 104 shown in FIG. 1, for example, in accordance with the RSSI value input from the signal strength output unit 140, that is, the level of the correlation signal.

FIG. 6 is an explanatory diagram showing a relationship between received signal strength and correlation level that are displayed by a display unit.

Referring to FIG. 6, the level of correlation signals along a time axis is illustrated in a line chart. Regarding the correlation signals, when the level of the correlation signal exceeds the threshold Th, for example, the synchronization unit 130 output the synchronization detection signal to the signal strength output unit 140. In the example of FIG. 6, a peak P1 of the correlation signal exceeds the threshold Th at a time T1, and the synchronization detection signal is output to the signal strength output unit 140 at the time T1. The signal strength output unit 140 outputs the peak value of the correlation signal to the display unit 148 as a value of RSSI signal during the RSSI survival period $T_{hold}$ after the synchronization detection signal is input from the synchronization unit 130. During the rest of the time, the signal strength output unit 140 outputs a value equivalent to zero to the display unit 148 as a value of RSSI signal. As the result, the display unit 148 displays the received signal strength zero before the synchronization is detected (T<T1). From the time the synchronization is detected until the RSSI survival period elapses (T1≤T<T1+$T_{hold}$), the display unit 148 displays the received signal strength corresponding to the RSSI value (strength 3 in the example of FIG. 6). Then, when the RSSI survival period has elapsed (without any new synchronization detected) (T1+$T_{hold}$≤T), the display unit 148 displays the received signal strength zero again.

Referring back to FIG. 2 again, the explanation will be continuously given on an example of the configuration of the radio communication device 100.

When the synchronization unit 130 detects synchronization, the demodulation unit 150 demodulates the received signal according to a certain modulation method. And the demodulation unit 150 outputs the demodulated received signal to a MAC (media access control) layer included in the upper layer 160.

The upper layer 160 includes layers upper than a physical layer in the communication protocol stack. For example, the upper layer 160 may include only layers located in relatively lower position such as a MAC layer. Moreover, the upper layer 160 may include layers located in relatively upper position such as an application layer. For example, a part of the upper layer 160 may execute the quantization of the RSSI value or generation of the request signal or the like, explained above relating to the output control unit 142, instead of the output control unit 142.

The modulation unit 170 modulates the transmitted signal input from the upper layer 160 according to a specific modulation method. Then the modulation unit 170 outputs the modulated transmitted signal to the D/A converter 180.

The D/A converter 180 converts the transmitted signal in digital form that is input from the modulation unit 170 or the above-described request signal that is generated by the signal strength output unit 140 into analog form. Then the D/A converter 180 outputs the signal converted into analog form to the radio transmitting unit 190.

The radio transmitting unit 190 is typically implemented as a RF circuit, same as the above-described radio receiving unit 110. The radio transmitting unit 190 amplifies and executes frequency-conversion the analog signal input from the D/A converter 180, and then transmits it as a radio signal via the antenna 108. The radio signal to be transmitted from the radio transmitting unit 190 may include the above-described request signal that is generated by the signal strength output unit 140, for example, in addition to data signals generated in the upper layer 160.

<3. Timing Chart>

FIG. 7 and FIG. 8 are timing charts exemplifying a RSSI value output by the radio communication device 100. FIG. 7 shows a case (a first scenario) where the radio communication device 100 continuously receives packets in a relatively short interval. On the other hand, FIG. 8 shows a case (a second scenario) where the next packet is not received for relatively long period of time more than the RSSI survival period after one packet has been received.

(The First Scenario)

Referring to FIG. 7, in the upper part of the drawing, three packets P1, P2 and P3 received in order by the radio communication device 100 are illustrated. Moreover, in the lower part of the drawing, time change in the RSSI value output from the signal strength output unit 140 of the radio communication device 100 is illustrated.

Firstly, at time T1, preamble of the packet P1 is received, and if the synchronization unit 130 detects synchronization, the RSSI value is set to L1. This RSSI value is retained until the RSSI survival period $T_{hold}$ will elapse, that is, until the time T1+$T_{hold}$. Then when the RSSI survival period $T_{hold}$ elapses, the RSSI value becomes zero. When a preamble of packet P2 is received at time T2 and the synchronization unit 130 detects synchronization, the RSSI value is set to L2. This RSSI value is also to be retained until the RSSI survival period $T_{hold}$ elapses. Then when the RSSI survival period $T_{hold}$ elapses, the RSSI value becomes zero. Further, when a preamble of packet P3 is received at time T3 and the synchronization unit 130 detects synchronization, the RSSI value is set to L3.

Thus, by outputting, as the RSSI value, the level of the correlation signal output as a result of the correlation by the synchronization unit 130, and outputting continuously this RSSI value during a prescribed period of time after synchronization has been detected, it is possible to reflect the change of receiving signals status in the RSSI value to notify the user promptly.

(The Second Scenario)

Referring to FIG. 8, packet to be received by a radio communication device 100b is illustrated in the upper part of the drawing, and packets to be received by the radio communication device 100a is illustrated in the middle part of the drawing. Further, in the lower part of the drawing, time change in the RSSI value output by the signal strength output unit 140 of the radio communication device 100a.

Firstly, at time T4, preamble of the packet P1 is received by the radio receiving unit 110 of the radio communication device 100a, and if the synchronization unit 130 detects synchronization, the RSSI value is set to L4. This RSSI value is retained until the RSSI survival period $T_{hold}$ will elapse, that is, until the time T4+$T_{hold}$. Then when the RSSI survival period $T_{hold}$ elapses, the RSSI value becomes zero.

Assuming that no packet is received by the radio communication device 100a over a certain period of time $T_{hold}*\alpha$ ($\alpha$ is real number), the radio transmitting unit 190 of the radio communication device 100a transmits a packet for probe P5 illustrated in FIG. 8, for example, as a request signal for requesting another radio communication device located in close proximity thereto to transmit radio signals.

Such packet for probe P5 is to be received, for example, by the radio communication device 100b. Then the radio communication device 100b transmits an acknowledgment packet (Ack) P6 as a response signal to the packet for probe P5. Then the radio communication device 100a receives the acknowledgment packet P6, and synchronization is detected at time T6, for example. As the result, the RSSI value is updated to L6 in the radio communication device 100a.

As described above, the radio communication device 100 can dynamically update the RSSI value by transmitting a request signal that requests another radio communication device located in close proximity thereto to transmit radio signals if synchronization is not detected over a certain period of time. Note that if a time period for providing a trigger to transmit a request signal is set to the integral multiple of the RSSI survival period (that is, setting the above-mentioned $\alpha$ to integral number, it enables to reuse the time setting on the timer 144 for the measurement of the RSSI survival period. And this can simplify the implementation of the signal strength output unit 140.

Moreover, the request signal may be transmitted only when the radio communication device 100 requests to communicate with another radio communication device. For example, in the example of FIG. 1, in a case where the radio communication device 100a requests the radio communication device 100b to transmit an image data, the radio communication device 100a is on the side of requesting communication. According to this configuration, if the radio communication device 100a alone transmits the request signal, the RSSI value can be updated in both of the radio communication device 100a and the radio communication device 100b. This enables to prevent transmission of redundant radio signals in the whole system, and to decrease power consumption. Note that determination whether the local device requests for communication can be executed by an application or the like that is included in the upper layer 160 shown in FIG. 2, for example.

<4. Conclusion>

Up here, referring to FIG. 1 to FIG. 8, explanations are given on the overview of the radio communication system 1 and the specific configuration of the radio communication device 100 according to an embodiment of the present invention. According to the embodiment, in the radio communication device 100, the level of the correlation signal calculated by the correlation performed in order to detect synchronization can be output as received signal strength. In such a configuration, it is unnecessary to execute additional processing such as conversion from control level information of the auto gain control or smoothing in order to obtain received signal strength, therefore, it is possible to obtain the received signal strength promptly with less processing amount. This enables a short-range high-speed radio communication to display received signal strength following promptly the change in receiving status of radio signals. Moreover, according to the present embodiment, the level of the correlation signal at a time when detected synchronization is continuously output as received signal strength until a prescribed time period elapses after synchronization has been detected. This enables a user to surely stay in visual contact with the received signal strength corresponding to the peak value of the correlation signal at a time when detected synchronization. Moreover, if synchronization is not detected, a value equivalent to zero is output instead of the level of the correlation signal as the received signal strength, therefore, it is possible to notify the user promptly that communication is not to be performed due to conditions such as "outside the range" or "outside of communication range". Further, if synchronization is not detected over a certain period of time, a request signal that requests another radio communication device located in close proximity to transmit radio signals, therefore it is possible to continuously display or output the received signal strength while control communication or data communication is not performed.

It should be understood by those skilled in the art that various modifications, combinations, sub-combinations and alterations may occur depending on design requirements and other factors insofar as they are within the scope of the appended claims or the equivalents thereof.

What is claimed is:

1. A radio communication device comprising:
    a radio receiving unit configured to receive radio signals;
    a synchronization unit configured to perform a correlation calculation for received signals output from the radio receiving unit, and to detect synchronization based at least in part on a result of the correlation calculation; and
    a signal strength output unit configured to:
        determine that the result of the correlation calculation is within a range of values, the range of values having an upper bound and a lower bound;
        identify a signal strength previously associated with the range of values; and
        output an indication of the signal strength from the radio communication device.

2. A radio communication device according to claim 1, wherein the signal strength output unit continuously outputs the indication of the signal strength until a prescribed time period elapses after the synchronization unit has detected synchronization.

3. A radio communication device according to claim 2, wherein the signal strength output unit outputs a value equivalent to zero as the indication of the signal strength if the synchronization unit does not detect synchronization.

4. A radio communication device according to claim 3, further comprising:

a radio transmitting unit to transmit a request signal that requests another radio communication device located in close proximity thereto to transmit radio signals if the synchronization unit does not detect synchronization over a certain period of time.

5. A radio communication device according to claim 1, further comprising:
a display unit configured to output the indication of the signal strength by displaying the indication of the signal strength.

6. A radio communication device according to claim 4, wherein the request signal is transmitted only when the radio communication device requests to communicate with another radio communication device.

7. A signal strength output method for outputting signal strength of received signals in a radio communication device including a radio receiving unit to receive radio signals and to output the received signals, the method comprising:
detecting synchronization based at least in part on a result of a correlation calculation for the received signals; and
outputting a signal strength of the received signals by:
determining that the result of the correlation calculation is within a range of values, the range of values having an upper bound and a lower bound;
identifying a signal strength previously associated with the range of values; and
outputting an indication of the signal strength from the radio communication device.

8. A radio communication system comprising:
a radio transmitting device including a radio transmitting unit to transmit radio signals; and
a radio receiving device including:
a radio receiving unit to receive the radio signals transmitted from the radio transmitting device;
a synchronization unit to perform a correlation calculation for received signals output from the radio receiving unit and to detect synchronization based at least in part on a result of the correlation calculation; and
a signal strength output unit configured to:
determine that the result of the correlation calculation is within a range of values, the range of values having an upper bound and a lower bound;
identify a signal strength previously associated with the range of values; and
output an indication of the signal strength from the radio communication device.

9. A radio communication device according to claim 1, wherein the radio receiving unit is configured to receive radio signals using a wireless communication protocol.

10. A radio communication device according to claim 1, wherein the radio receiving unit is configured to receive radio signals using a mobile communication protocol.

11. A radio communication device according to claim 5, wherein the display unit is configured to display the indication of the signal strength as one of a plurality of levels, the plurality of levels each indicating a signal strength of a received signal.

* * * * *